Patented June 17, 1952

2,600,668

UNITED STATES PATENT OFFICE 2,600,668

INSECTICIDAL COMPOSITION COMPRISING DDT, PYRETHRINS, AND PIPERONYL BUTOXIDE

Lawrence C. McAlister, Jr., Cheverly, Md., assignor, by mesne assignments, to National Distillers Products Corporation, New York, N. Y., a corporation of Virginia No Drawing. Application June 12, 1947, Serial No. 754,262

6 Claims. (Cl. 167—24)

1

This invention relates to insecticidal compositions.

The invention contemplates insecticidal compositions containing as active ingredients (1) pyrethrins, (2) 1,1,1-trichloro-2,2-bis(p-chlorophenyl)-ethane (commonly known as DDT) and (3) a compound having the structural formula:

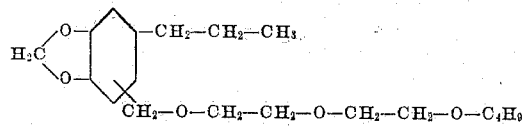

The piperonyl butoxide, containing item (3) referred to above, may be prepared in accordance with the application of Herman Wachs, Serial No. 658,872, filed April 1, 1946, and entitled "Compositions," now Patent 2,485,680. This application discloses that chloromethyl dihydrosafrol (methylene dioxypropyl benzylchloride) can be prepared by the reaction of formaldehyde and hydrochloric acid on dihydrosafrol. The application further discloses that this chloride may be reacted with the sodium salt of diethylene glycol monobutyl ether (butyl "Carbitol") to form the ether derivative by the splitting off of sodium chloride.

Having thus indicated the scope of the present invention, the following examples, which are to be considered not limitative, are included to illustrate in detail the preparation, use, and advantage of specific compositions falling within the ranges of the present invention.

EXAMPLE I

A wettable powder was prepared as follows: 25 gms. of DDT, 2 gms. of the butyl "Carbitol" derivative of chloromethyl dihydrosafrol (prepared as described in Serial No. 658,872 by the reaction of the chloromethyl derivative of dihydrosafrol and the sodium salt of diethylene glycol monobutyl ether), 1 gm. of pyrethrum extract containing 20% of pyrethrins and 2 gms. of a wetting and dispersing agent (monobutyl phenylphenol sodium monosulfonate) were dissolved in 50 ml. of acetone. The solution was then slowly added to 70 gms. of pyrophyllite with continuous mixing. The mixing was continued until the product was homogeneous. The acetone was then allowed to evaporate completely at room temperature. The evaporation of the acetone required about 24 hours, and the dry powder obtained after the evaporation was milled to remove lumps and then mixed again to insure the uniformity of the mixture.

Unfinished plywood panels, which were 12 inches square, were sprayed with a water suspension of the dry powder to give the dosage per square foot of the active ingredients indicated in Table I. To prepare the water suspension employed in spraying the panels, 0.96 gm. of the wettable powder was suspended in water and made up to a total volume of 100 ml. 5 ml. of this water suspension was sprayed on each square foot of area of plywood panel.

Batches of house flies were exposed on the sprayed panels for a period of four hours, and the average percentage of the paralyzed or knocked-down flies was obtained. The flies were then removed from the sprayed surfaces and placed in clean holding cages containing food and water so that observations might be obtained on the average percentage mortality of the flies at the end of a period of 24 hours.

As Table I shows, comparative tests were run on plywood panels sprayed solely with DDT and on plywood panels sprayed solely with a mixture of the butyl "Carbitol" derivative and pyrethrins. Table I shows also that these knockdown and mortality tests were repeated at periodic intervals over a period of 13 weeks.

*Table I*

| Active Ingredients | Dosage: Mg./Sq. Ft. |
|---|---|
| DDT | 12.00 |
| Butyl "Carbitol" derivative | .96 |
| Pyrethrins | .096 |

| | 1 Day | 3 Wks. | 6 Wks. | 10 Wks. | 13 Wks. |
|---|---|---|---|---|---|
| Percent Knockdown in 4 hours after end of | 92 | 49 | 22 | 16 | 0 |
| Percent Mortality in 24 hours at end of | 100 | 100 | 64 | 49 | 24 |

| Active Ingredients | Dosage: Mg./Sq. Ft. |
|---|---|
| DDT | 12.0 |

| | 1 Day | 3 Wks. | 6 Wks. | 10 Wks. | 13 Wks. |
|---|---|---|---|---|---|
| Percent Knockdown in 4 hours at end of | 32 | 0 | 0 | 0 | 0 |
| Percent Mortality in 24 hours at end of | 53 | 6 | 3 | 2 | 2 |

| Active Ingredients | Dosage: Mg./Sq. Ft. |
|---|---|
| Butyl "Carbitol" derivative | 8.0 |
| Pyrethrins | 0.8 |

| | 1 Day | 3 Wks. | 6 Wks. | 10 Wks. | 13 Wks. |
|---|---|---|---|---|---|
| Percent Knockdown in 4 hours at end of | 14 | 28 | 28 | 4 | 0 |
| Percent Mortality in 24 hours at end of | 5 | 2 | 15 | 4 | 2 |

EXAMPLE II

Using the procedure described in Example I, a wettable powder was prepared and made into a water suspension which was sprayed on unfinished plywood panels to give the dosages indicated in Table II. This table also gives the results of exposing houseflies to these and to comparison panels.

Table II

| Active Ingredients | Dosage: Mg./Sq. Ft. |
|---|---|
| DDT | 12.0 |
| Butyl "Carbitol" derivative | 1.92 |
| Pyrethrins | .192 |

|  | 1 Day | 3 Wks. | 6 Wks. | 10 Wks. | 13 Wks. |
|---|---|---|---|---|---|
| Percent Mortality in 4 hours at end of | 100 | 100 | 42 | 20 | 4 |
| Percent Mortality in 24 hours at end of | 100 | 100 | 95 | 65 | 39 |

| Active Ingredients | Dosage: Mg./Sq. Ft. |
|---|---|
| DDT | 12.0 |

|  | 1 Day | 3 Wks. | 6 Wks. | 10 Wks. | 13 Wks. |
|---|---|---|---|---|---|
| Percent Knockdown in 4 hours at end of | 32 | 0 | 0 | 0 | 0 |
| Percent Mortality in 24 hours at end of | 53 | 6 | 3 | 2 | 2 |

| Active Ingredients | Dosage: Mg./Sq. Ft. |
|---|---|
| Butyl "Carbitol" derivative | 8.0 |
| Pyrethrins | .8 |

|  | 1 Day | 3 Wks. | 6 Wks. | 10 Wks. | 13 Wks. |
|---|---|---|---|---|---|
| Percent Knockdown in 4 hours at end of | 14 | 28 | 28 | 4 | 0 |
| Percent Mortality in 24 hours at end of | 5 | 2 | 15 | 4 | 2 |

When using a spray containing DDT as the sole insecticidal ingredient, it is known that the spray should be applied to a surface in amount such that each square foot of the surface is coated with about 200 mg. of DDT, in order that the surface may possess satisfactory knockdown and mortality effects on insects over a period of time. It is also known that DDT presents a definite toxicity hazard to warm-blooded animals. The compositions of this invention, as the examples and their accompanying tables show, are advantageous in that their active components comprise predominantly DDT, and yet they may be applied to a surface to the extent of only about 12 mg. of DDT per square foot to provide a surface having excellent insect-paralyzing and insect-killing properties over an extended period of time.

The examples also illustrate the unique properties of the compositions contemplated by the present invention in that over an extended period of time the three-component mixture of active insecticidal ingredients, when applied to a surface, gives an unexpectedly greater knockdown effect than the sum of the knockdown effect of (a) the DDT alone plus (b) the knockdown effect of the mixture of pyrethrins and the butyl Carbitol derivative of chloromethyl dihydrosafrol, i. e., piperonyl butoxide. The prolonged residual effectiveness of the insecticide of the invention is shown by the fact that a three-component mixture of pyrethrin, 1,1,1-trichloro-2,2-bis (p-chlorophenyl)-ethane and the butyl Carbitol derivative of chloromethyl dihydrosafrol when sprayed on the surface of plywood panels 12 inches square so that the surface of each contained 12 mg. of DDT, 1.92 mg. of the piperonyl butoxide and .192 mg. of pyrethrins had, after four hours, on house flies, a knockdown of 11% and a mortality effect of 25%, after 263 days. This compares, after a like period, with a knockdown of 0% and a mortality effect of 6% for a two-component mixture containing 12 mg. and .192 mg. respectively, of DDT and pyrethrins; a knockdown of 0% and a mortality effect of 2% for a two-component mixture containing .192 mg. and 1.92 mg., respectively, of pyrethrins and the piperonyl butoxide; a knockdown of 0% and a mortality effect of 9% for a two-component mixture containing 12 mg. and 1.92 mg., respectively, of DDT and the piperonyl butoxide; a knockdown of 0% and a mortality effect of 11% for DDT alone; a knockdown of 2% and a mortality effect of 2% for pyrethrins alone; and a knockdown of 0% and a mortality effect of 2% for the piperonyl butoxide; each in the respective amounts specified above. A similar statement is true with respect to the mortality effect of the compositions of the present invention. In general, therefore, the compositions of this invention comprise those mixtures of the three active ingredients which possess significantly greater paralyzing and killing effects when applied to a surface than the maximum corresponding effects predictable from the separate action of the DDT alone plus the separate action of the pyrethrins admixed with the piperonyl butoxide alone, e. g., of the order of 50% greater. As a rule, such mixtures are provided when it contains from about 40 to about 200 parts by weight of DDT per part of pyrethrins and from about 5 to about 20 parts of the piperonyl butoxide per part of pyrethrins.

The examples illustrate one embodiment of the compositions of this invention in that they are specific to the preparation of a wettable powder. The art of preparing wettable powders is well known, and thus in place of the particular wetting and dispersing agents employed in the examples there may be used any of a wide variety of known wetting and dispersing agents, in proportions greater or less than those employed in the examples. Furthermore, any of a wide variety of materials may be used as an inert carrier, e. g., walnut shell flour, exhausted pyrethrum flowers, talc, diatomaceous earth, clay, etc. These wettable powders as such may be used as dusting powders, or may be dispersed in water, as is shown in the examples.

In the examples, a volatile solvent was used in the preparation of the three-component mixture of insecticidal ingredients. However, wettable powders may also be made by milling with an inert carrier solid DDT and a powder wetting and dispersing agent, and then impregnating the piperonyl butoxide and pyrethrins onto the inert carrier using either a volatile solvent or a comparatively non-volatile solvent. The use of a non-volatile solvent is particularly advantageous in large-scale operations, because of reduced fire and explosion hazards, in comparison with the use of a volatile solvent. For example, to prepare a wettable powder, containing 12.5% of DDT, 2% of the butyl "Carbitol" derivative of chloromethyl dihydrosafrol, and 0.2% of pyrethrins, the following method was used:

0.24 lb. of a liquid concentrate comprising 50% of the butyl "Carbitol" derivative of chloromethyl dihydrosafrol and 25% of pyrethrum extract, containing 20% of pyrethrins, in an odorless base petroleum oil was sprayed into 3 lbs. of a 25% DDT wettable powder (made by milling the DDT and a wetting and dispersing agent) while mixing in a Day-type mixer. The mixing was continued for about 10 minutes and then 2.76 lbs. of pyrophyllite was added, after which the mixing was conducted for another 10 minutes. The product was then immediately put through a hammer mill to remove lumps, and again mixed to insure the uniformity of the mixture. This mixture may be dispersed in water as shown in the above examples or may be used as a dusting powder.

As a further variation, the compositions of the present invention may be used in the form of a dust, e. g., the powder used in the examples in the preparation of the water suspension which was later sprayed on the plywood panels. Thus, the compositions of this invention may be used in several forms, i. e., as a dust, in an aqueous suspension, or in solution in an organic solvent, such as kerosenes and other base oils or dichlorodifluoro-methane containing auxiliary solvents to assist in the solution of the DDT, such as aromatic hydrocarbons (e. g., benzene, toluene, the xylenes, alkylated naphthalenes, tetralin, etc.), dekalin, cyclohexanone, etc.

I claim:

1. An insecticidal composition having prolonged residual effectiveness the active ingredients of which consist essentially of (1) pyrethrins, (2) 1,1,1 - trichloro - 2,2 - bis(p-chlorophenyl)-ethane and (3) piperonyl butoxide having the structural formula

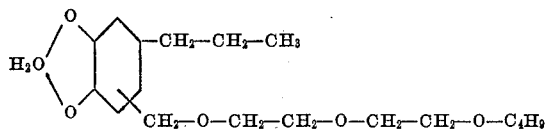

the said composition when uniformly applied to a surface in an amount sufficient to coat the surface with about 12 mg. of constituent (2) per square foot yields a surface having over a period of several weeks knockdown and mortality effects on insects exposed thereto at least 50% greater than the corresponding sum of the knockdown and mortality effects of (a) a similar surface coated with the same amount of pyrethrins and piperonyl butoxide plus the knockdown and mortality effect of (b) a similar surface coated with the same amount of constituent (2).

2. The insecticidal composition having prolonged residual effectiveness of claim 1 in which constituent (2) is present in a proportion within the range of 40 to 200 parts by weight per part of the pyrethrins and the piperonyl butoxide is present in a proportion within the range of 5 to 20 parts per part of the pyrenthrins.

3. The insecticidal composition having prolonged residual effectiveness of claim 1 containing 125 parts of constituent (2) by weight per part of the pyrethrins and 10 parts by weight of the piperonyl butoxide per part of the pyrethrins.

4. A substantially dry insecticidal powder having prolonged residual effectiveness the active ingredients of which consists essentially of (1) pyrethrins (2) 1,1,1-trichloro-2,2-bis (p-chlorophenyl)-ethane and (3) the mono-n-butyl ether of diethylene glycol derivative of chloromethyl dihyrosafrol.

5. An insecticidal composition having prolonged residual effectiveness composed of an aqueous suspension the active ingredients of which consist essentially of (1) pyrethrins (2) 1,1,1-trichloro-2,2-bis (p-chlorophenyl) - ethane and (3) the mono-n-butyl ether of diethylene glycol derivative of chloromethyl dihydrosafrol.

6. An insecticidal composition having prolonged residual effectiveness composed of a solution in an organic solvent of active insecticidal ingredients consisting essentially of (1) pyrethrins (2) 1,1,1-trichloro-2,2-bis (p-chlorophenyl)-ethane and (3) the mono-n-butyl ether of diethylene glycol derivative of chloromethyl dihydrosafrol.

LAWRENCE C. McALISTER, Jr.

REFERENCES CITED

The following references are of record in the file of this patent:

UNITED STATES PATENTS

| Number | Name | Date |
| --- | --- | --- |
| Re. 22,700 | Muller | Dec. 4, 1945 |
| Re. 22,922 | Muller | Sept. 30, 1947 |
| 2,362,128 | Gertler | Nov. 7, 1944 |
| 2,421,569 | La Forge | June 3, 1947 |
| 2,421,570 | La Forge | June 3, 1947 |
| 2,452,188 | Hedenburg | Oct. 26, 1948 |
| 2,457,957 | Wachs | Jan. 4, 1949 |
| 2,485,680 | Wachs | Oct. 25, 1949 |

FOREIGN PATENTS

| Number | Country | Date |
| --- | --- | --- |
| 583,503 | Great Britain | Dec. 19, 1946 |

OTHER REFERENCES

Gersdorff et al. in J. Econ. Entomology, volume 37, No. 1, February 1944, page 137. (Copy in Division 43.)